(12) United States Patent
Chen et al.

(10) Patent No.: US 9,357,602 B1
(45) Date of Patent: May 31, 2016

(54) LED DIMMING AND DRIVING METHOD AND CIRCUIT USING THE SAME

(71) Applicant: ANWELL SEMICONDUCTOR CORP., Hsin-Chu (TW)

(72) Inventors: Ke-Horng Chen, Hsinchu (TW);
Shao-Wei Chiu, Hsin-Chu (TW);
Chun-Chieh Kuo, Hsin-Chu (TW);
Shih-Ping Tu, Hsin-Chu (TW);
Kai-Chang Chuang, Hsin-Chu (TW)

(73) Assignee: Anwell Semiconductor Corp., Hsin-Chu (TW)

( * ) Notice: Subject to any disclaimer, the term of this patent is extended or adjusted under 35 U.S.C. 154(b) by 0 days.

(21) Appl. No.: 14/587,176

(22) Filed: Dec. 31, 2014

(51) Int. Cl.
*H05B 37/02* (2006.01)
*H05B 33/08* (2006.01)

(52) U.S. Cl.
CPC ........ *H05B 33/0815* (2013.01); *H05B 33/0845* (2013.01)

(58) Field of Classification Search
CPC ................... H05B 33/0815; H05B 41/2828
USPC .................................... 315/291, 294
See application file for complete search history.

(56) References Cited

U.S. PATENT DOCUMENTS

2014/0077724 A1* 3/2014 Sawada ............... H02M 3/157
315/307
2015/0264759 A1* 9/2015 Hatta ............... H05B 37/0254
315/291

* cited by examiner

*Primary Examiner* — Don Le
(74) *Attorney, Agent, or Firm* — Rosenberg, Klein & Lee

(57) ABSTRACT

In an LED dimming and driving method and its circuit, a receiver, a current source and a controller are installed in a dimming module, and after the receiver has received a dimming signal, the current source is driven to output a current with a magnitude corresponsive to the dimming signal, and then after the controller has converted the current into a voltage level by a terminal resistor, the magnitude of the driving current of the LED is adjusted according to the voltage level to improve a linear dimming accuracy.

5 Claims, 4 Drawing Sheets

LED DIMMING AND DRIVING METHOD AND CIRCUIT USING THE SAME

BACKGROUND OF THE INVENTION

1. Field of the Invention

The present invention relates to the technology of controlling the light intensity of illumination devices, and more particularly to a light emitting diode (LED) dimming and driving method of controlling brightness by a current signal and a circuit using the method, and a non pulse width modulation (PWM) signal is used for controlling the brightness to enhance the efficiency of the circuit and the dimming accuracy.

2. Description of the Related Art

In general, a dimming circuits of most LED lamps changes a voltage phase of a power supply by using a switch device such as a silicon controller rectifier (SCR) or a tri-electrode AC switch (TRIAC Switch) and changes the total driving voltage outputted from a driving circuit by switching a phase conduction angle, so as to adjust the driving current inputted into an LED source and achieve a dimming effect. Although such dimming device has the advantages of easy control and simple installation, the voltage waveform of the power supply may be situated at a distortion status to give rise to the problems of a low PF and an increased harmonic voltage. According to the current/voltage (I/V) characteristic curve of LED, LED is a nonlinear element. In other words, the ratio of voltage to current is not a direct proportional ratio, so that the aforementioned dimming method has an inaccurate dimming effect and consumes much power since the change of the driving voltage and the change of driving current are unequal, and thus resulting in an inaccurate dimming effect and consuming much power. Therefore, a conventional driving circuit of an LED generally connects a transistor and a sensing resistor in series and uses the sensing resistor to detect an LED current and then regulates a duty ratio of a pulse width modulation (PWM). By controlling the conduction or disconnection of the transistor by the PWM signal, the outputted driving voltage can be regulated to keep the LED current constant.

Although the aforementioned driving circuit is applicable for the mains power of 80-260V and provides a convenient use, the driving circuit is affected by the properties of the TRIAC component. If the voltage frequency of the PWM signal is too low and the current passing through the TRIAC is lower than the required operating current, the TRIAC will be switched repeatedly, so that the driving current will be not be continuous, and a blinking problem of the LED occurs. On the other hand, if the voltage frequency of the PWM signal is too high, a change of the voltage of the signal will be too quick to cause noises and interferences, result in an abnormal operation of the LED, and reduce practicality. To overcome the aforementioned problem, a conventional PWM driving circuit 1 having a dimmer 10 as shown in FIG. 1 includes a compensation circuit 12 additionally installed next to a control circuit 11 and comprised of a reference voltage generator 120, a voltage sampler 121, a comparator 122 and a control switch 123, wherein the comparator 122 is provided for comparing a reference voltage generated by the reference voltage generator 120 with a sample voltage formed by the voltage sampler 121, and if the sample voltage is smaller than the reference voltage, a control voltage will be outputted to the control switch 123, so that the compensation circuit 12 and the control circuit 11 form a loop, and the control switch 123 provides a hold current to the control circuit 11 to assure the operating stability of the dimmer 10 and prevent the blinking issue of the LED. Although such additionally installed compensation circuit 12 can assure a stable operating quality of the dimmer 10, there is a power loss that affects the overall system efficiency severely, and the method of using the TRIAC to output the voltage signal for the dimming purpose may have a loss of signals during the signal transmission, and thus the dimming efficiency may be affected adversely.

Therefore, it is a main subject of the present invention to improve the dimming mechanism, components and structure of the LED driving circuit to assure the normal operating efficiency of the overall circuit, and the operating stability and the dimming accuracy of the LED lamps.

SUMMARY OF THE INVENTION

In view of the aforementioned problem of the prior art, it is a primary objective of the present invention to provide an LED dimming and driving method and its circuit that use a current signal to control the current of an LED for dimming, so as to avoid a loss of voltage signal that may affect the dimming accuracy.

To achieve the aforementioned objective, the present invention provides an LED dimming and driving method comprising the steps of: using a dimming module installed in an LED dimming and driving circuit to adjust the brightness of a plurality of LED strings; and using the dimming module to adjust a driving current of the LED strings by a current signal to achieve the effect of enhancing a linear dimming accuracy, characterized in that after the dimming module receives a dimming signal, an internal current source is driven to output current with a magnitude corresponsive to the dimming signal, and a terminal resistor is used to convert the current into a voltage level, and the driving currents are adjusted according to the voltage level to affect the brightness of the LED strings.

Wherein, the dimming module intercepts the driving current by a current mirror to obtain a brightness value, and after the voltage level is compared with the brightness value, the current mirror adjusts the magnitude of the driving currents to achieve a linear dimming effect. In addition, the LED dimming and driving method further comprises the steps of detecting a driving current of the LED strings to obtain a minimum driving voltage and comparing and adjusting a conduction cycle of a cycle switch installed in the LED dimming and driving circuit to adjust the total output of the output voltage to assure that the total output voltage is greater than a forward bias voltage of the LED strings.

To achieve the aforementioned objective, the present invention further provides an LED dimming and driving circuit comprising a conversion module, an energy distribution module and a dimming module, and the energy distribution module is electrically coupled to the conversion module and a plurality of LED strings, and the LED strings are electrically coupled to the dimming module, and a transformer is installed in the conversion module for supplying an output voltage generated by sensing an input voltage by the energy distribution module to the LED strings, so that each LED string has a driving current, characterized in that the dimming module comprises a receiver, a current source and a controller, and the controller includes a terminal resistor electrically coupled to the LED strings and the current source, and the current source is electrically coupled to the receiver, and after the receiver has received a dimming signal, the current source is driven to output a current with a magnitude corresponsive to the dimming signal and provided for the controller to convert the current into a voltage level by the terminal resistor and regulate the magnitude of the driving currents.

In addition, the energy distribution module comprises a minimum voltage detector, an error amplifier, a comparator and a cycle switch, and the minimum voltage detector is coupled to the LED strings and a positive input terminal of the error amplifier, and a negative input terminal of the error amplifier receives a reference value, and the output terminal is coupled to a negative input terminal of the comparator, and an output terminal of the comparator is coupled to the cycle switch, and both ends of the cycle switch are respectively and electrically coupled to the transformer and the LED strings, and the minimum voltage detector is provided for detecting a driving current of the LED strings to obtain a minimum driving voltage which is provided for the error amplifier to determine the minimum driving voltage and the reference value to obtain an error value, and the total output of the output voltage is regulated and compared with the error value after the comparator regulates a conduction cycle of the cycle switch by a triangular wave, so as to assure the total output voltage is greater than a forward bias voltage of the LED strings.

In summation, the present invention achieves a dimming effect without using the method of controlling the phase angle of the input voltage by the TRIAC to regulate the working cycle of the output voltage. In other words, the method of adjusting the light intensity of the LED by using the PWM signal is not used, so that the present invention does not have the issues of obvious dimming delay or poor dimming accuracy

DETAILED DESCRIPTION OF THE PREFERRED EMBODIMENTS

The aforementioned and other objectives, technical characteristics and advantages of the present invention will become apparent with the detailed description of preferred embodiments and the illustration of related drawings as follows.

Figure 1:
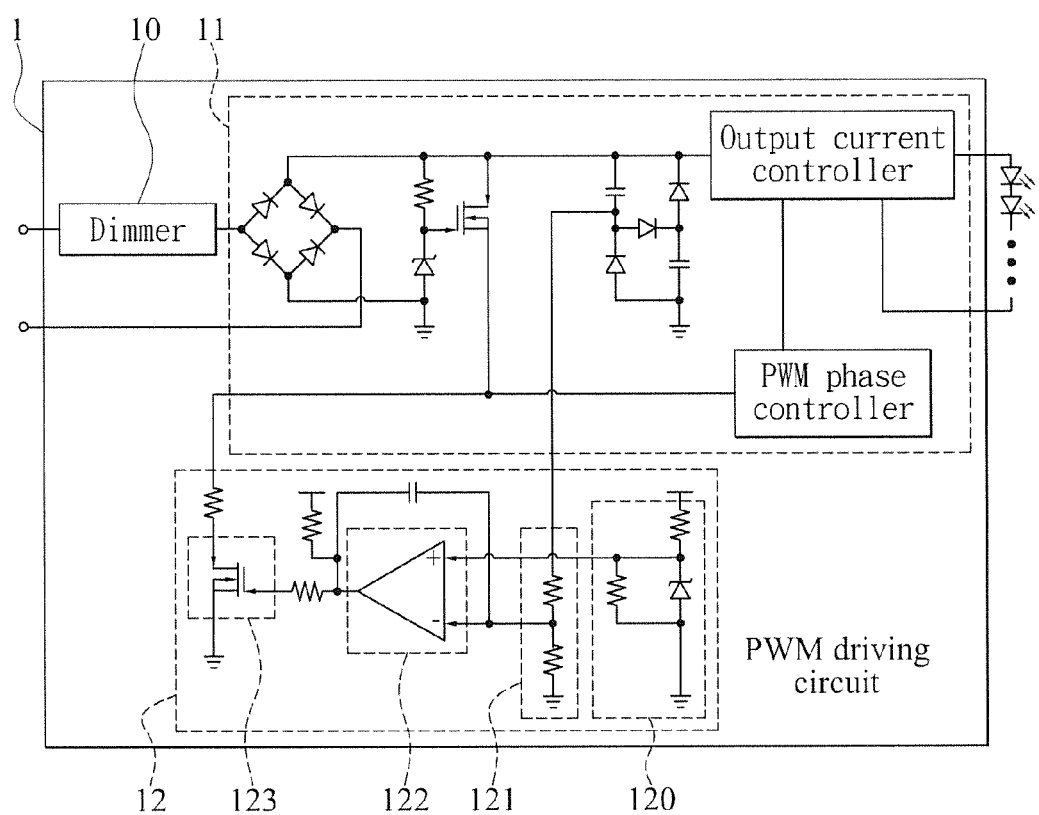
FIG. 1 is a schematic circuit diagram of a conventional PWM driving circuit.
Figure 2:
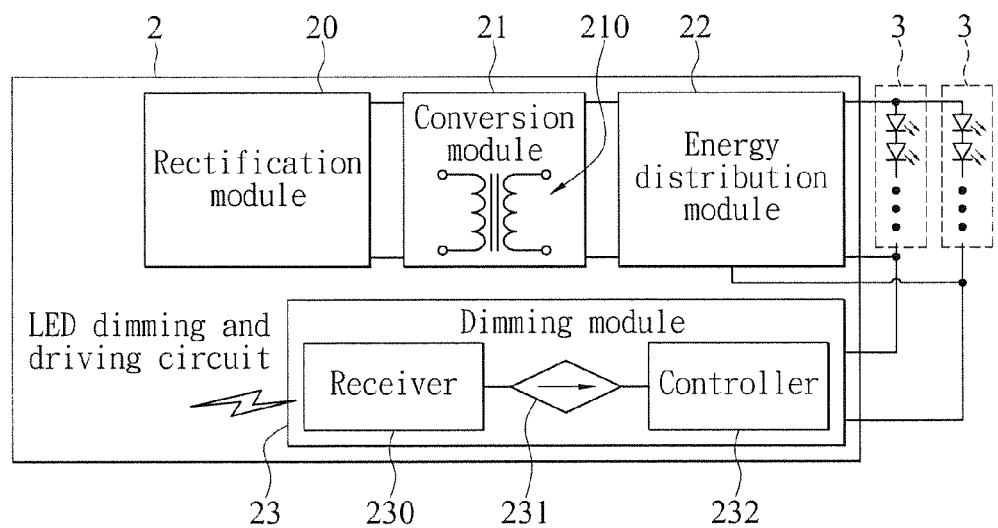
FIG. 2 is a schematic block diagram of a preferred embodiment of the present invention.
Figure 3:
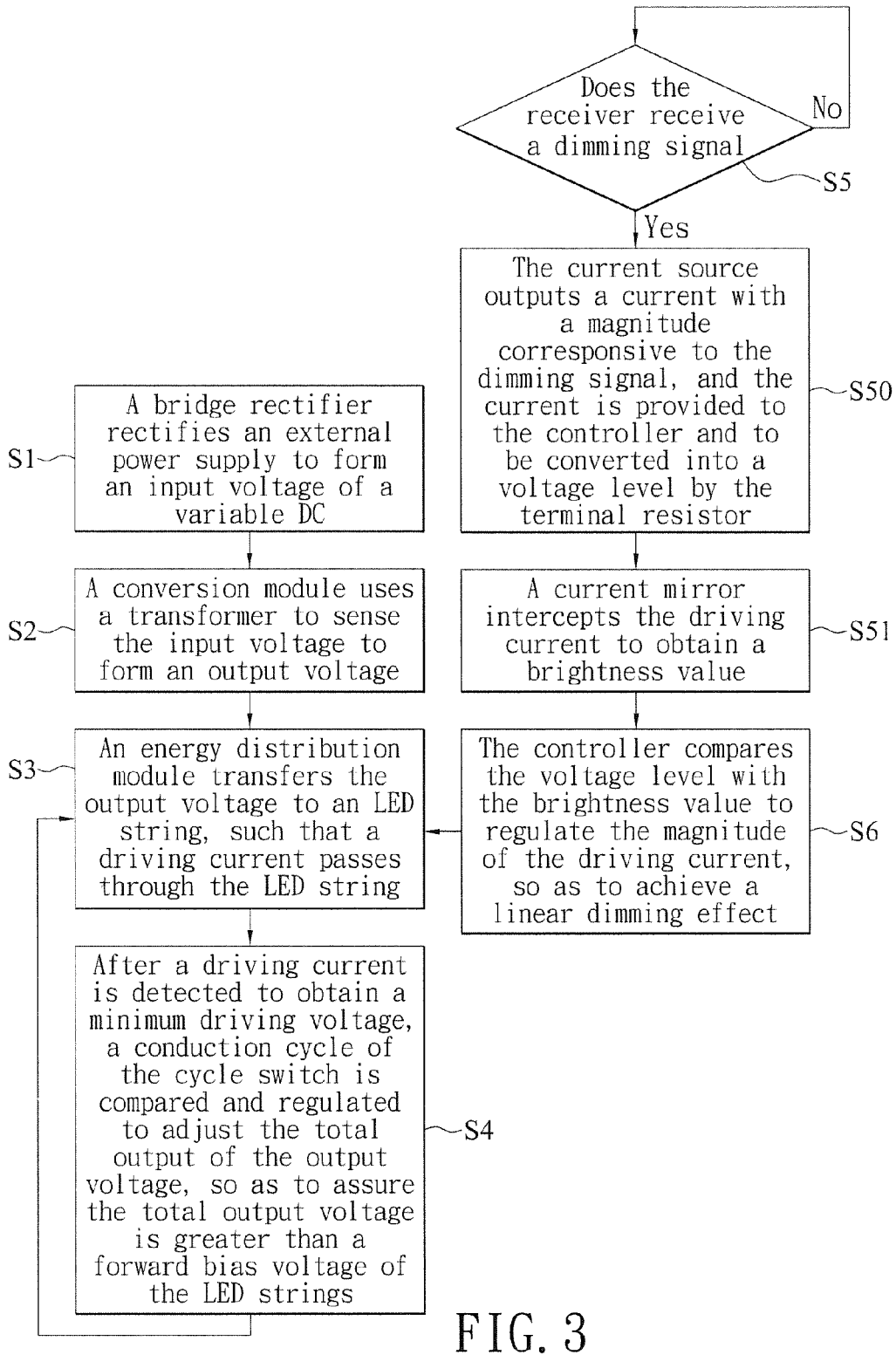
FIG. 3 is a flow chart of a preferred embodiment of the present invention.
Figure 4:
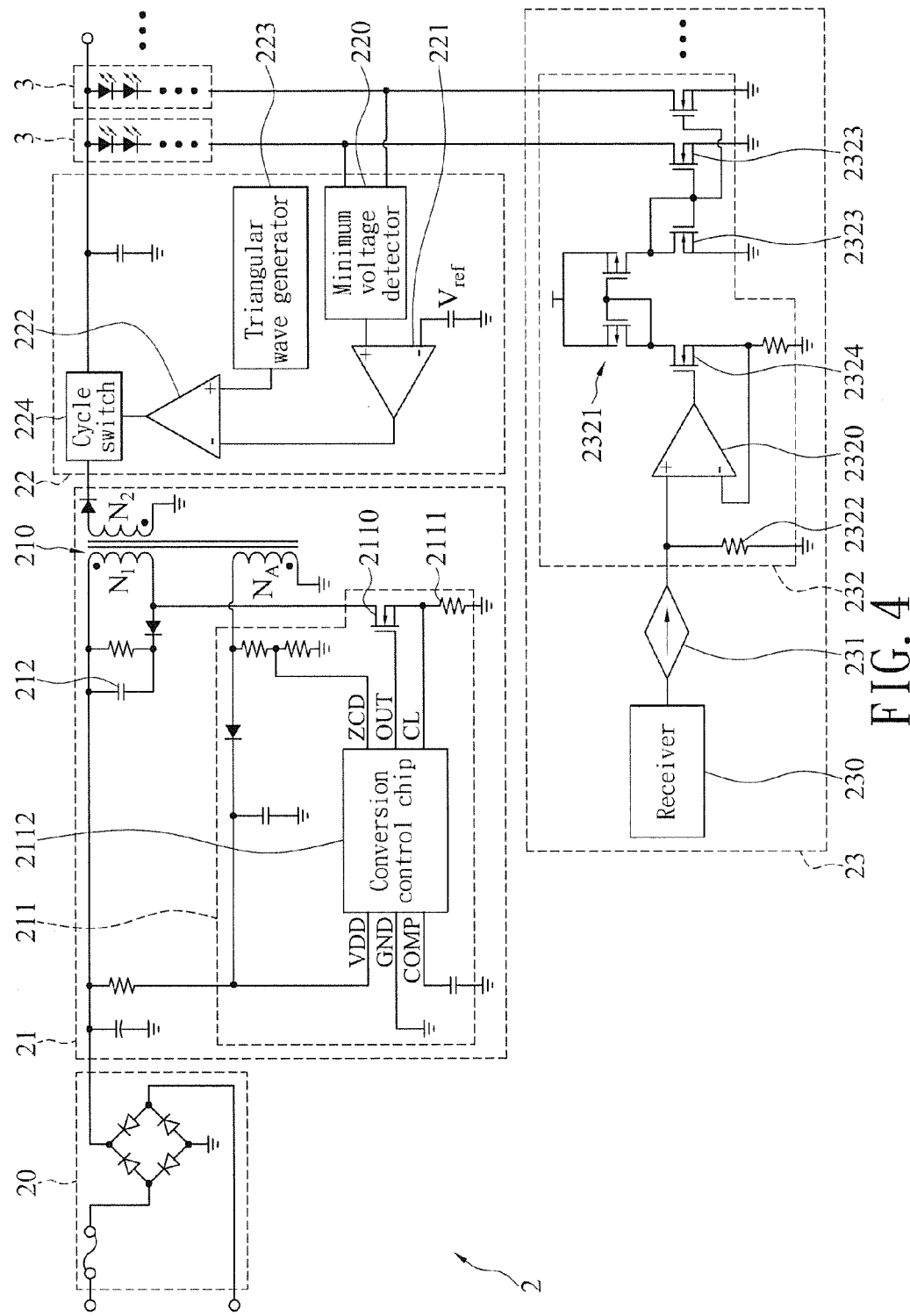
FIG. 4 is a schematic circuit diagram of a preferred embodiment of the present invention.

With reference to FIGS. 2 to 4 for a schematic block diagram, a flow chart, and a schematic circuit diagram of an LED dimming and driving circuit 2 of a preferred embodiment of the present invention respectively, the LED dimming and driving circuit 2 is applied in a liquid crystal display device, a television or an LED lamp and electrically coupled to a plurality of LED strings 3, and the LED dimming and driving circuit 2 comprises a rectification module 20, a conversion module 21, an energy distribution module 22 and a dimming module 23, wherein the energy distribution module 22 is electrically coupled to the conversion module 21 and the LED strings 3, and the LED strings 3 are electrically coupled to the dimming module 23. The rectification module 20 which is a bridge rectifier circuit coupled to an external power supply (not shown in the figure) and the conversion module 21, and the conversion module 21 comes with a flyback, forward, full bridge, half bridge or push-pull switching effect, or adopts a power conversion circuit with a coupling coil such as a LLC serial resonant coil as the main architecture and having a transformer 210 and a conversion controller 211.

For example, the conversion module 21 of a primary-side control flyback power conversion circuit architecture includes a transformer 210 with a primary-side coil (N1), a secondary-side coil (N2) and an auxiliary coil, and the conversion controller 211 includes a current transistor 2110, a current resistor 2111 and a conversion control chip 2112, and the primary-side coil is connected to the current transistor 2110 and the current resistor 2111 in series and then coupled to the conversion control chip 2112. The energy distribution module 22 includes a minimum voltage detector 220, an error amplifier 221, a comparator 222, a triangular wave generator 223 and a cycle switch 224, wherein the minimum voltage detector 220 is coupled to the LED strings 3 and a positive input terminal of the error amplifier 221, and a negative input terminal of the error amplifier 221 is provided for receiving a reference value (Vref) and an output terminal of the error amplifier 221 is coupled to a negative input terminal of the comparator 222. A positive input terminal of the comparator 222 is coupled to the triangular wave generator 223 and provided for receiving a triangular wave, and an output terminal of the comparator 222 is coupled to the cycle switch 224, and both ends of the cycle switch 224 are respectively and electrically coupled to the secondary-side coil and the LED strings 3. The dimming module 23 includes a receiver 230, a current source 231 and a controller 232, and the controller 232 is comprised of an operational amplifier 2320, a current mirror 2321 and a terminal resistor 2322. An end of the current mirror 2321 is coupled to the LED strings 3 through a plurality of first regulators 2323 respectively, and the other end of the current mirror 2331 is coupled to an output terminal and a negative input terminal of the operational amplifier 2320 through a second regulator 2324, and a positive input terminal of the operational amplifier 2320 is coupled to the terminal resistor 2322 and the current source 231, and the current source 231 is electrically coupled to the receiver 230.

The LED dimming and driving method of the present invention comprises the following steps:

S1: The bridge rectifier of the LED dimming rectifies and converts an AC voltage of the external power supply into an input voltage.

S2: The input voltage charged or discharged by an energy storage capacitor 212 is provided for the energy storage of the primary-side coil to form a primary-side current, and the secondary-side coil senses a change of the primary-side current to form an output voltage by the principle of electromagnetic induction. It is noteworthy that the conversion control chip 2112 performs detections through the current resistor 2111 and regulates the value of the primary-side current by the current transistor 2110 to control the output voltage at a stable voltage value.

S3: The energy distribution module 22 outputs the output voltage to the LED strings 3, such that a driving current passes through each LED string 3.

S4: The minimum voltage detector 220 detects a driving current of the LED strings 3 to obtain a minimum driving voltage, and provides the driving current to the error amplifier 221 to determine the minimum driving voltage and the reference value to obtain an error value, and after the comparator 222 compares the error value by using the triangular wave, a conduction cycle of the cycle switch 224 is regulated to adjust the total output of the output voltage, so as to assure the total output voltage is greater than a of the LED strings 3 while maintaining the driving currents at a constant value.

S5: The receiver 230 determines whether or not to receive a dimming signal. If yes, the receiver 230 may receive a dimming signal via wireless or cable transmission.

S50: The receiver 230 drives the current source 231 to output a current with a magnitude corresponsive to the dimming signal, and the current is converted into a voltage level by of the controller 232 by the terminal resistor 2322.

S51: The current mirror 2321 receives the driving current from the second regulator 2324 to obtain a brightness value.

S6: The operational amplifier 2320 compares the voltage level with the brightness value to regulate the operating status of the second regulator 2324, so as to regulate the conduction and cutoff cycle of the first regulators 2323 to affect the magnitude of the driving currents and achieve a linear dimming effect.

What is claimed is:

1. An LED dimming and driving method, comprising the steps of using a dimming module installed in an LED dimming and driving circuit to adjust the brightness of a plurality of LED strings; and using the dimming module to adjust a driving current of the LED strings by a current signal to achieve the effect of enhancing a linear dimming accuracy, characterized in that after the dimming module receives a dimming signal, an internal current source is driven to output current with a magnitude corresponsive to the dimming signal, and a terminal resistor is used to convert the current into a voltage level, and the driving currents are adjusted according to the voltage level to affect the brightness of the LED strings, wherein the dimming module intercepts the driving current by a current mirror to obtain a brightness value, and after the voltage level is compared with the brightness value, the current mirror adjusts the magnitude of the driving currents to achieve a linear dimming effect.

2. The LED dimming and driving method of claim 1, further comprising the steps of: detecting a driving current of the LED strings to obtain a minimum driving voltage, comparing and adjusting a conduction cycle of a cycle switch installed in the LED dimming and driving circuit to adjust the total output of the output voltage to assure that the total output voltage is greater than a forward bias voltage of the LED strings.

3. An LED dimming and driving circuit, comprises a conversion module, an energy distribution module and a dimming module, and the energy distribution module is electrically coupled to the conversion module and a plurality of LED strings, and the LED strings are electrically coupled to the dimming module, and a transformer is installed in the conversion module for supplying an output voltage generated by sensing an input voltage by the energy distribution module to the LED strings, so that each LED string has a driving current, characterized in that the dimming module comprises a receiver, a current source and a controller, and the controller includes a terminal resistor electrically coupled to the LED strings and the current source, and the current source is electrically coupled to the receiver, and after the receiver has received a dimming signal, the current source is driven to output a current with a magnitude corresponsive to the dimming signal and provided for the controller to convert the current into a voltage level by the terminal resistor and regulate the magnitude of the driving currents.

4. The LED dimming and driving circuit of claim 3, wherein the controller is comprised of an operational amplifier, a current mirror and the terminal resistor, and an end of the current mirror is coupled to the LED strings, and the other end of the current mirror is coupled to an output terminal and a negative input terminal of the operational amplifier, and a positive input terminal of the operational amplifier is coupled to the terminal resistor and the current source, and after the current mirror intercepts the driving current to obtain a brightness value, the operational amplifier compares the voltage level with the brightness value and adjusts the magnitude of the driving currents by the current mirror to achieve a linear dimming effect.

5. The LED dimming and driving circuit of claim 4, wherein the energy distribution module comprises a minimum voltage detector, an error amplifier, a comparator and a cycle switch, and the minimum voltage detector is coupled to the LED strings and a positive input terminal of the error amplifier, and a negative input terminal of the error amplifier receives a reference value, and the output terminal is coupled to a negative input terminal of the comparator, and an output terminal of the comparator is coupled to the cycle switch, and both ends of the cycle switch are respectively and electrically coupled to the transformer and the LED strings, and the minimum voltage detector is provided for detecting a driving current of the LED strings to obtain a minimum driving voltage which is provided for the error amplifier to determine the minimum driving voltage and the reference value to obtain an error value, and the total output of the output voltage is regulated and compared with the error value after the comparator regulates a conduction cycle of the cycle switch by a triangular wave, so as to assure the total output voltage is greater than a forward bias voltage of the LED strings.

* * * * *